(12) United States Patent
Lu

(10) Patent No.: US 9,838,616 B2
(45) Date of Patent: Dec. 5, 2017

(54) IMAGE PROCESSING METHOD AND ELECTRONIC APPARATUS

(71) Applicant: Lenovo (Beijing) Co., Ltd., Haidian District, Beijing (CN)

(72) Inventor: Xiaopeng Lu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/980,895

(22) Filed: Dec. 28, 2015

(65) Prior Publication Data
US 2017/0054921 A1  Feb. 23, 2017

(30) Foreign Application Priority Data

Aug. 18, 2015 (CN) .......................... 2015 1 0509153

(51) Int. Cl.
| H04N 5/262 | (2006.01) |
| H04N 5/235 | (2006.01) |
| H04N 5/232 | (2006.01) |
| G06T 5/00 | (2006.01) |
| G06T 5/50 | (2006.01) |

(52) U.S. Cl.
CPC ........... H04N 5/2621 (2013.01); G06T 5/002 (2013.01); G06T 5/50 (2013.01); H04N 5/2351 (2013.01); H04N 5/2352 (2013.01); H04N 5/23232 (2013.01); G06T 2207/10016 (2013.01); G06T 2207/20221 (2013.01)

(58) Field of Classification Search
CPC .. H04N 5/2621; H04N 5/2351; H04N 5/2352; H04N 5/23232; G06T 5/50; G06T 5/002; G06T 2207/20221; G06T 2207/10016
See application file for complete search history.

(56) References Cited

U.S. PATENT DOCUMENTS

| 2,011,242 A | 8/1935 | Girard | |
| 2011/0109778 A1* | 5/2011 | Yoshida | ............. H04N 5/23293 348/294 |

(Continued)

FOREIGN PATENT DOCUMENTS

| CN | 101763651 | 6/2010 |
| CN | 104125407 | 10/2014 |
| CN | 104333750 | 2/2015 |

OTHER PUBLICATIONS

First Office Action dated Oct. 10, 2017 (10 pages including English translation) from Chinese priority Application No. 201510509153.3.

*Primary Examiner* — Hung Lam
(74) *Attorney, Agent, or Firm* — Brinks Gilson & Lione; G. Peter Nichols

(57) ABSTRACT

An image processing method and an electronic apparatus are described. The image processing method is applied to an electronic apparatus and includes performing a photometry to current environment; determining a unit shutter speed according to a result of the photometry, a specified photosensitivity and a specified aperture value; and capturing, when a first operation is detected, a plurality of images sequentially by using the specified photosensitivity, the specified aperture value and the unit shutter speed and synthesizing the plurality of images until a second operation is detected.

10 Claims, 8 Drawing Sheets

(56) References Cited

U.S. PATENT DOCUMENTS

| | | | | |
|---|---|---|---|---|
| 2012/0262602 A1* | 10/2012 | Wada | ............... | H04N 1/00397 |
| | | | | 348/231.4 |
| 2013/0329090 A1* | 12/2013 | Ise | ............... | H04N 5/2355 |
| | | | | 348/240.99 |
| 2014/0204338 A1* | 7/2014 | Murase | ............... | A61B 3/102 |
| | | | | 351/206 |
| 2014/0313367 A1* | 10/2014 | Iwasaki | ............... | H04N 5/2351 |
| | | | | 348/222.1 |
| 2015/0181107 A1* | 6/2015 | Park | ............... | H04N 5/2353 |
| | | | | 348/353 |
| 2016/0112644 A1* | 4/2016 | Nishi | ............... | H04N 5/374 |
| | | | | 348/222.1 |

\* cited by examiner

| 255 | 0 |
|---|---|
| 0 | 0 |

↓ Down-sampling

| 64 |
|---|

↓ Up-sampling

| 64 | 64 |
|---|---|
| 64 | 64 |

FIG. 7

IMAGE PROCESSING METHOD AND ELECTRONIC APPARATUS

This application claims priority to Chinese Patent Application No. 201510509153.3 filed on Aug. 18, 2015, the entire contents of which are incorporated herein by reference.

The present disclosure relates to an image processing method and an electronic apparatus, and especially relates to an image processing method and an electronic apparatus which can obtain a motion track of an object in an environment full of light without reducing an aperture value or adjusting a photosensitivity, so as to realize an effect of slow shutter speed while avoiding overexposure.

BACKGROUND

Today, not only electronic apparatuses dedicated to shooting such as a digital camera, but also portable intelligent electronic apparatuses such as a smart phone, a notebook computer and a tablet computer and so on, have a shooting function. With development of science and technology, the electronic apparatuses such as a smart phone have more and more powerful shooting function, and as compared with a bulky single lens reflex camera, such electronic apparatuses have advantages such as lightweight, easy operation and so on, and thus users are provided with great convenience.

However, sometimes people take a photo at a relatively slow shutter speed, so as to obtain an image of a motion track of an object. For example, under a normal sunlight condition, in order to express a speed of a moving object (e.g., running water), a shutter speed of a few seconds may be used to take a photo. For another example, when the users desire to obtain an image of a star track at night, a shutter speed of several minutes or even more than ten minutes may be needed. However, the relatively slow shutter speed may cause long exposure time of a sensitive chip, so it is likely to cause overexposure if light is adequate. Although exposure may be reduced in a manner of reducing a photosensitivity (ISO) or an aperture value according to a reciprocity law in photography, generally the photosensitivity may be only minimized to ISO 100, and an adjusting range of the aperture value is limited, too. In particular, for other electronic apparatuses which are not dedicated to shooting, since the shooting function is not a main function thereof, the aperture value may be not adjustable. Moreover, reducing the aperture value may result in enlarging a depth of field, which cannot meet needs of the users for a small depth of field. People can also use a gray mirror to reduce the exposure, but it is required to provide the gray mirror in front of the lens, which may be inconvenient to the users, and gray values of the gray mirror are also difficult to control.

SUMMARY

The present disclosure is completed in view of the foregoing issue, and has an objective of providing an image processing method and an electronic apparatus, which can simulate a slow shutter speed, i.e., can obtain a motion track of an object in an environment full of light without reducing an aperture value or adjusting a photosensitivity, so as to avoid overexposure and realize an effect of slow shutter speed at the same time.

One embodiment of the present disclosure provides an image processing method, applied to an electronic apparatus, wherein the method comprises: performing a photometry to current environment; determining a unit shutter speed according to a result of the photometry, a specified photosensitivity and a specified aperture value; and capturing, when a first operation is detected, a plurality of images sequentially by using the specified photosensitivity, the specified aperture value and the unit shutter speed and synthesizing the plurality of images until a second operation is detected.

An embodiment of the present disclosure further provides an electronic apparatus, wherein the electronic apparatus comprises: a camera, configured to capture an image; a sensor, configured to perform a photometry to current environment; a processor, configured to determine a unit shutter speed according to a result of the photometry, a specified photosensitivity and a specified aperture value, and when a first operation is detected, capture a plurality of images sequentially by using the specified photosensitivity, the specified aperture value and the unit shutter speed and synthesize the plurality of images until a second operation is detected.

The image processing method and the electronic apparatus according to the present disclosure can simulate a slow shutter speed, i.e., can obtain a motion track of an object in an environment full of light without reducing an aperture value or adjusting a photosensitivity, so as to realize an effect of slow shutter speed while avoiding overexposure

BRIEF DESCRIPTION OF THE DRAWINGS

FIG. 7 is a schematic diagram for illustrating principles of a down-sampling and an up-sampling to an image.

DETAILED DESCRIPTION

In order to make those skilled in the art better understand technical solutions of the present disclosure, the implementation manners of the image processing method and the electronic apparatus of the present disclosure will be described in detail in conjunction with the drawings. Of course, the present disclosure is not limited thereto, and those skilled in the art can obtain other embodiment(s), which should be within the scope of the present disclosure.

Image Processing Method

Hereinafter, the image processing method of the present disclosure will be described in detail in conjunction with the drawings. The image processing method of the present disclosure is applied to an electronic apparatus, wherein the electronic apparatus, for example, may be a device which focuses on shooting such as a digital camera, or may be a device which focuses on a calculating function such as a tablet computer, a laptop computer, a desktop computer, a PDA and so on, or may further be a device which focuses on a calling function such as a smart phone, a portable phone and so on, as long as it can shoot images. In description and drawings below, an example of obtaining an image of a star track is taken for description, but the disclosure is not limited thereto, and it may be used for obtaining an image of motion track of any object under any light condition.

Figure 1:
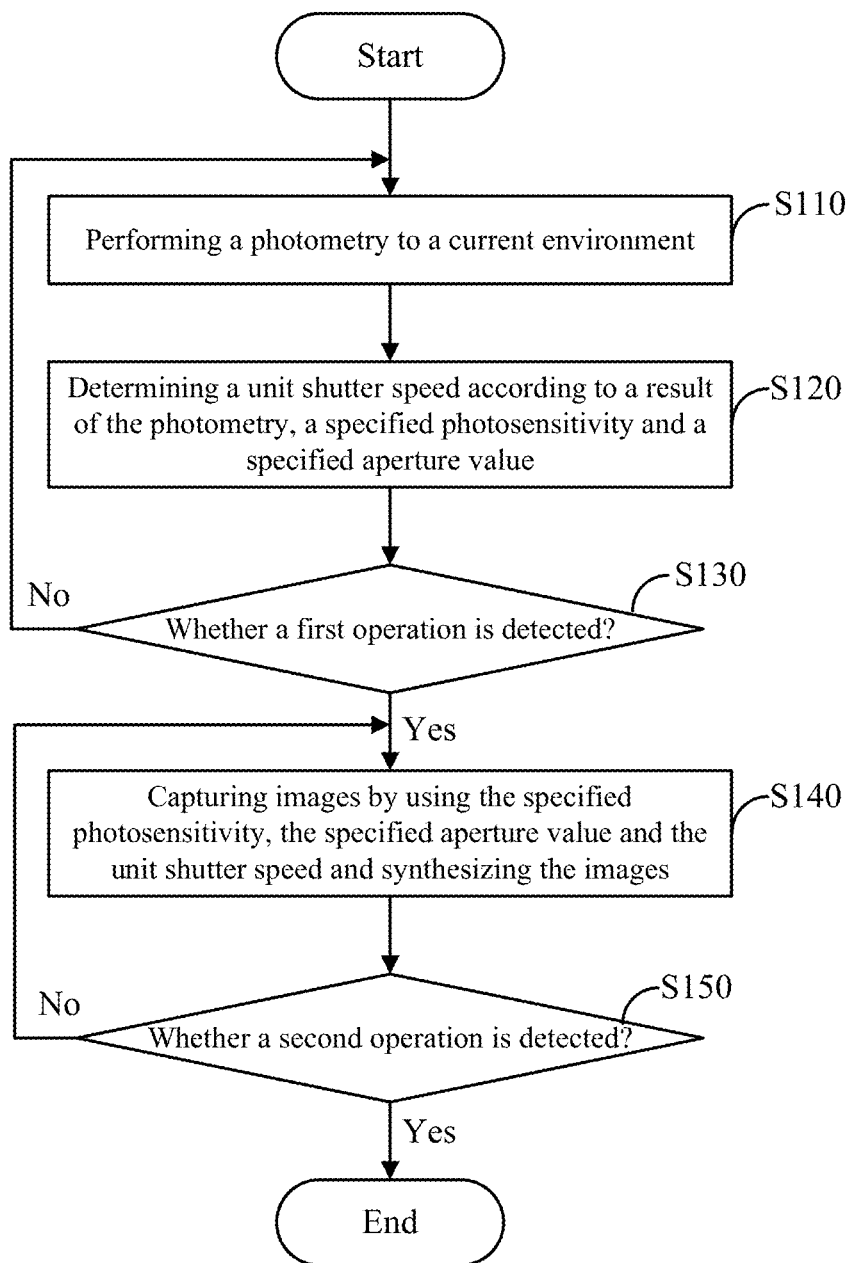
FIG. 1 is a flow chart of an image processing method according to the present disclosure.

FIG. 1 is a flow chart of an image processing method according to an embodiment of the present disclosure. As shown in FIG. 1, the method comprises steps S110-S150.

Firstly, performing a photometry to current environment (step S110). An existing photometric method may be used for performing a photometry, which will not be described in detail here. For an intelligent electronic apparatus, by enabling a camera application, the photometry may be performed to current environment and a preview image may be obtained. Preferably, the electronic apparatus may calculate which exposure parameters may be used to obtain an image with suitable exposure according to a result of the photometry. Generally speaking, an image of 18% Gray is considered to be suitable exposure for human eyes. However, in the present disclosure, the "suitable exposure" should be understood in a broad sense, that is, it represents an exposure effect expected by the users. For example, the users may perform exposure compensation according to their own needs, to make exposure higher or lower. The exposure parameters usually include a photosensitivity, an aperture value and a shutter speed.

Next, a unit shutter speed is determined according to a result of the photometry, a specified photosensitivity and a specified aperture value (step S120). The specified photosensitivity and the specified aperture value may be set automatically by the electronic apparatus according to scenarios, or set manually by a user. It should be noted that, here the specified photosensitivity and/or the specified aperture value may be different from a photosensitivity and/or an aperture value in a preview image displayed by the electronic apparatus. In addition, in some electronic apparatuses which are not dedicated to shooting such as a smart phone, the aperture value may be fixed, and at this time, the aperture value is the specified aperture value. After the photometry is completed, it may be determined which shutter speed may be used to obtain an image having an exposure amount desired by the users under the specified photosensitivity and the specified aperture value according to a reciprocity law in photography. At this moment, the determined shutter speed is just a unit shutter speed.

Next, detecting whether there is a first operation (step S130). The first operation may be an operation by which the users send an instruction to start shooting. As an unlimited example, the first operation may be to press a specified button (for example, a shutter key, a volume key or virtual buttons on a touch screen of the electronic apparatus) or carry out a certain action (shaking, tilting) and so on. In addition, it may also be to recognize a specified facial expression (blinking, etc.) through a camera of the electronic apparatus.

When the first operation is not detected (step S130, No), the photometry may be re-performed to the current environment (step S110), and a unit shutter speed may be re-determined according to a result of the photometry (step S120), and the first operation may be further detected (step S130). Because the users may change a target object at any time, and ambient light environment may change at any time, a new shutter speed should be determined according to continuous photometry, to adapt to changes in environment in real time. Of course, the present disclosure is not limited thereto, and the photometry may not be repeated, but the first operation is detected repeatedly (step S130).

When the first operation is detected (step S130,Yes), a plurality of images are captured sequentially by using the specified photosensitivity, the specified aperture value and the unit shutter speed and the plurality of images are synthesized (step S140). At this time, it is preferred to continuously capture the images at shorter time intervals in a burst shoot mode. Since exposure parameters are determined according to the result of the photometry, a plurality of images captured at this time are images with suitable exposure. And then, the plurality of images are synthesized. Views of the plurality of images captured in this way are approximately the same, and only relative positions of moving objects change, so that tracks of the moving objects may be obtained by synthesizing these images. Preferably, pixels without shifting are synthesized by using an average gray value, and pixels with shifting are synthesized in a manner of covering. Specific details of synthesizing the plurality of images will be described in detail hereinafter.

Detecting a second operation since the first operation is detected (step S150).The detecting step may be performed with the above steps of capturing images and synthesizing images in parallel or alternately. The second operation may be an operation by which the users send an instruction to end shooting. As an unlimited example, the second operation may be to release, to re-press a specified button (for example, a shutter key, a volume key or virtual buttons on a touch screen of the electronic apparatus) after the first operation, or to carry out a certain action (shaking, tilting) and so on. In addition, it may also be to recognize a specified facial expression (blinking, etc.) through a camera of the electronic apparatus.

When the second operation is not detected (step S150, No), images are further captured sequentially by using the specified photosensitivity, the specified aperture value and the unit shutter speed, and the images are synthesized. When the second operation is detected (step S150, Yes), processing comes to an end.

Through the above method, a motion track of an object in an environment full of light can be obtained without reducing an aperture value or adjusting a photosensitivity, so as to realize an effect of slow shutter speed while avoiding overexposure.

Hereinafter, a preferred embodiment of capturing a plurality of images and synthesizing the plurality of images will be described in conjunction with the drawings in detail. As described above, when a first operation is detected, a plurality of images are captured sequentially by using the specified photosensitivity, the specified aperture value and the unit shutter speed and the plurality of images are synthesized. For convenience, an example of capturing three images of a, b and c is taken for description hereinafter, but those skilled in the art should understand that the present disclosure is not limited thereto, and there may be a much larger number of images in practice.

Figure 2:
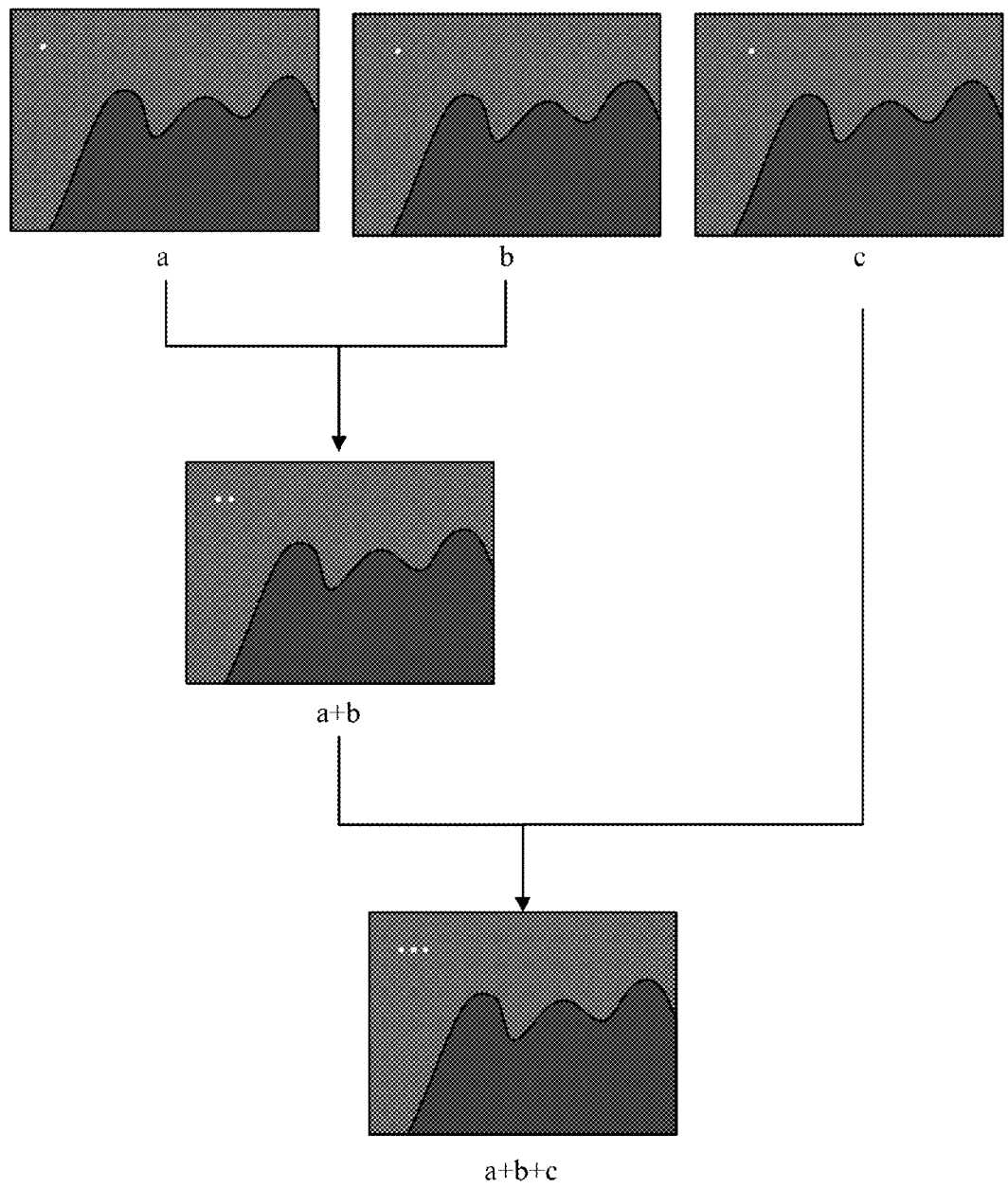
FIG. 2 is a schematic diagram for illustrating a preferred embodiment of a synthesizing process of an image processing method or an electronic apparatus according to the present disclosure.

FIG. 2 is a schematic diagram for illustrating a preferred embodiment of a synthesizing process of an image processing method or an electronic apparatus according to the present disclosure. As shown in FIG. 2, a first image a is stored as soon as it is obtained; next, when a second image b is obtained, a and b are synthesized to obtain an image a+b, and finally, when a third image c is obtained, the image a+b and the image c are synthesized, to obtain a final image a+b+c. Thus, it is possible to synthesize images while capturing, which may not only save running time, but also spare overhead of the memory.

Of course, the present disclosure is not limited thereto, the plurality of images a, b and c may be obtained at first, and then they are synthesized together, so as to directly obtain the image a+b+c.

Figure 3:
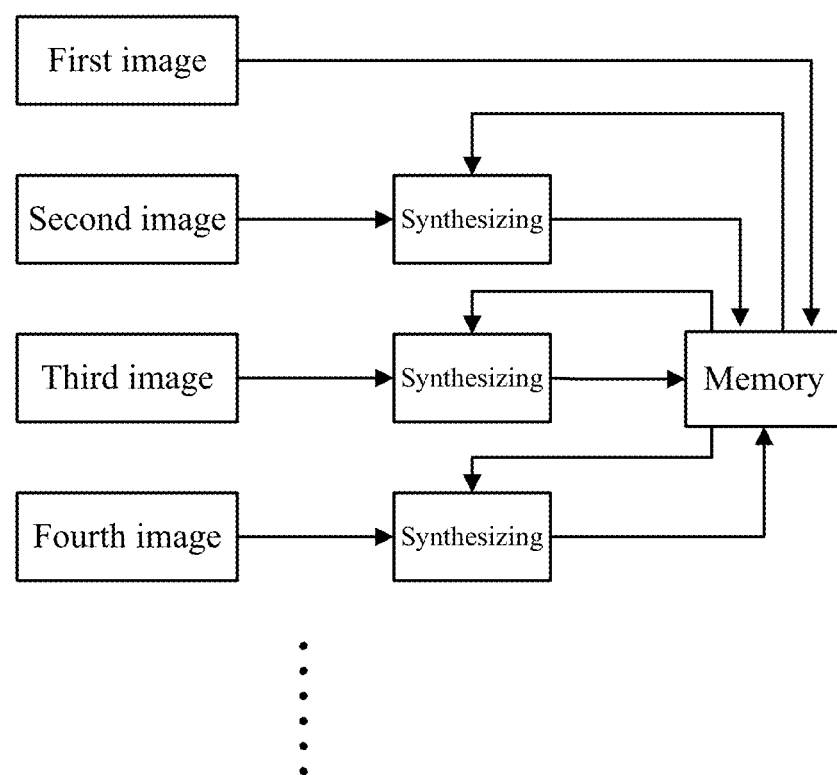
FIG. 3 is a schematic diagram for illustrating an operation of a memory in the preferred embodiment of the synthesizing process of the image processing method or the electronic apparatus according to the present disclosure.

Hereinafter, a preferred embodiment of the image processing method of the present disclosure will be further described in connection with FIG. 3. FIG. 3 is a schematic diagram for illustrating an operation of a memory in the preferred embodiment of the synthesizing process of the image processing method according to the present disclosure. As shown in FIG. 3, the electronic apparatus captures a first image by using the specified photosensitivity, the specified aperture value and the unit shutter speed when a first operation is detected, and stores the first image as a result image of a first round in a memory. Next, it comes to a second round of processing. In the second round of processing, the electronic apparatus further captures a second image by using the specified photosensitivity, the specified aperture value and the unit shutter speed, and reads the result image of a previous round (i.e., the first round) from the memory, and then synthesizes the second image and the result image of the first round, so as to generate a result image of the second round. When a second operation is not detected, the result image of the second round is stored in the memory and a third round of processing is performed. The result image of the second round is output when the second operation is detected. In the second round of processing, the electronic apparatus further captures a third image by using the specified photosensitivity, the specified aperture value and the unit shutter speed, and reads the result image of a previous round (i.e., the second round) from the memory, and then synthesizes the third image and the result image of the second round, so as to generate a result image of the third round. When the second operation is not detected, the result image of the third round is stored in the memory and a fourth round of processing is performed. When the second operation is detected, the result image of the third round is output. In a similar way, a final result image is output until the second operation is detected. Through this preferred embodiment, it is possible to use only one memory to perform the above-described operations repeatedly, which may not only save running time, but also spare overhead of the memory.

After the second operation is detected, even though the obtained image may reflect a track of a moving object, due to limitations such as a continuous shooting speed, running time of storing and synthesizing and so on, the track of the moving object is easy to have discontinuous states such as disconnecting and fracturing in a+b+c shown in FIG. 2. In order to better simulate a slow shutter speed, after the second operation is detected, a further processing may be performed to eliminate the discontinuous states. Here, the discontinuous states of moving objects in a finally synthesized image may be eliminated by using an image expansion technology; due to heavy overhead of running the image expansion technology, the present disclosure further provides a preferred embodiment to process the discontinuous states in the image.

Figure 4:
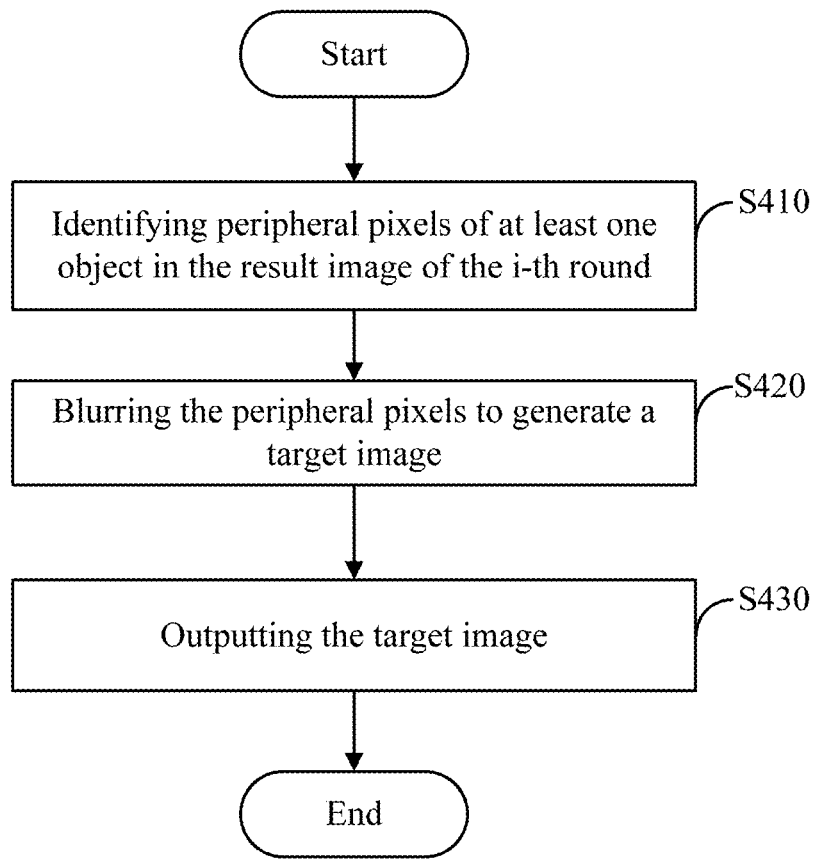
FIG. 4 is a flow chart of a preferred embodiment of outputting a target image in the image processing method according to the present disclosure.

FIG. 4 is a flow chart of a preferred embodiment of outputting a target image in the image processing method according to the present disclosure. As shown in FIG. 4, steps S410-S430 are included.

Firstly, peripheral pixels of at least one object in a final result image are identified (step S410). Taking shooting a star track for example, because moving objects are stars in the sky, which are shown as a plurality of bright points in the synthesized image in FIG. 2, peripheral pixels around the plurality of bright points should be identified. Here, the peripheral pixels may be identified by using an existing method, for example, an edge detection is performed by using a Canny operator or a Sobel operator; after a contour pixel is obtained, eight pixels around the contour pixel are identified as the peripheral pixels, and so on. In addition, the present disclosure further provides a preferred method for identifying peripheral pixels, which will be described in detail later.

Figure 5:
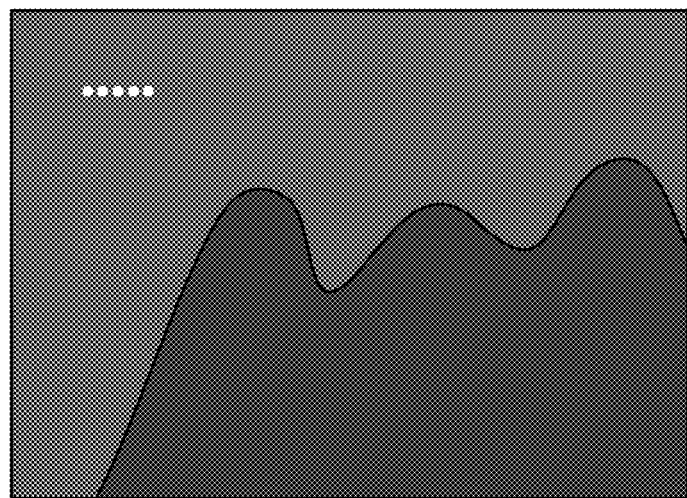
FIG. 5 is a schematic diagram for illustrating an effect of blurring a synthesized image.
Figure 5:
Figure 5:
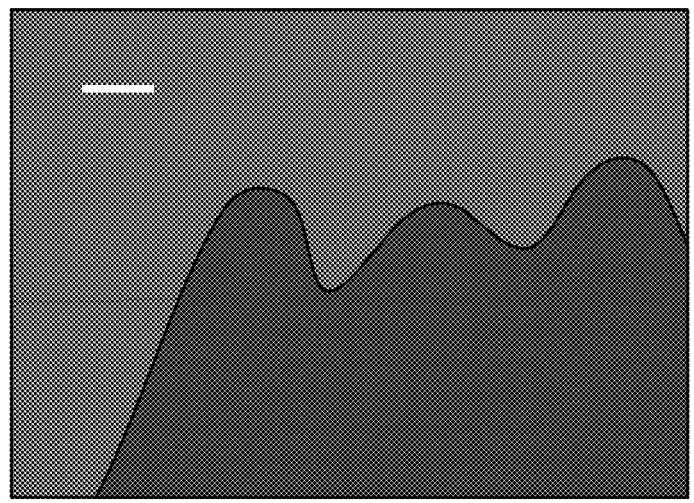

Then, the peripheral pixels are blurred to generate a target image (step S420). The peripheral pixels are blurred after the peripheral pixels around the moving object are identified, and thus the discontinuous pixels may be modified as continuous pixels, as shown in FIG. 5. The blurring process may be implemented by setting gray values of the peripheral pixels to average gray value of the pixels in a specified region of the peripheral pixels.

Finally, the target image is output (step S430).

In this way, the final target image can simulate a shooting with a slow shutter speed, that is, a motion track of an object in an environment full of light can be obtained without reducing an aperture value or adjusting a photosensitivity, so as to realize an effect of slow shutter speed while avoiding overexposure.

Figure 6:
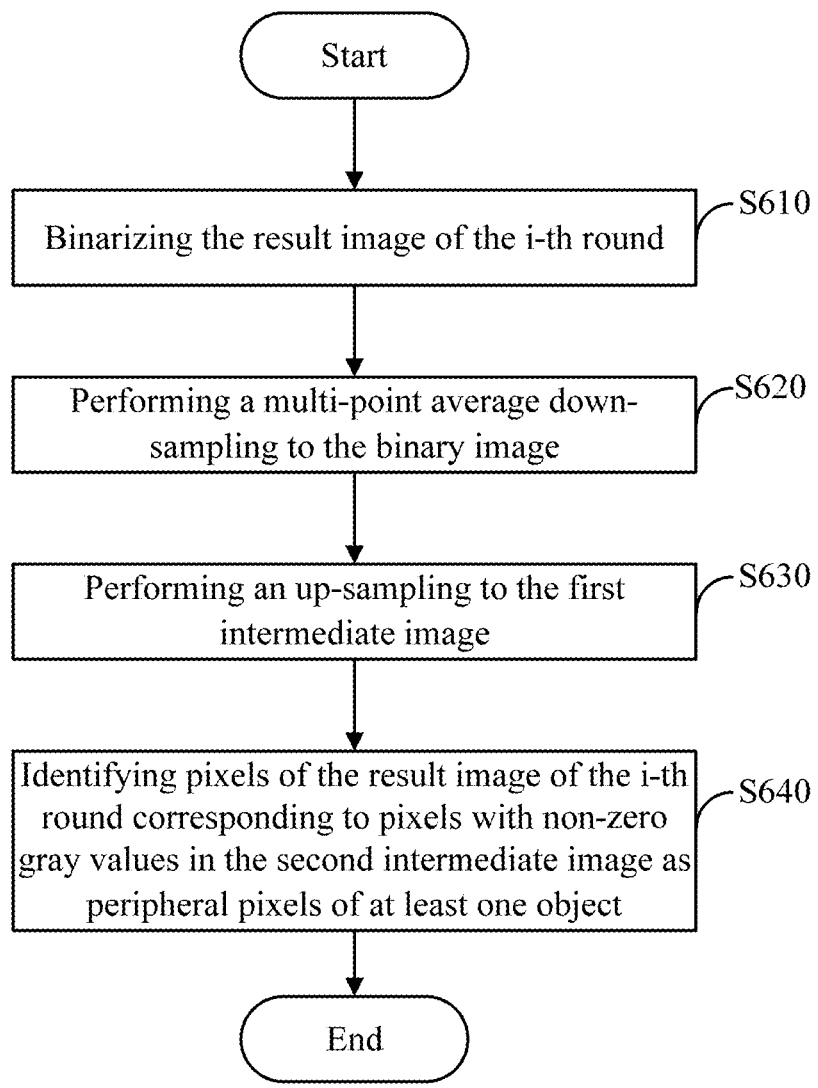
FIG. 6 is a flow chart of a preferred embodiment of identifying peripheral pixels of at least one object in the image processing method according to the present disclosure.

The present disclosure further provides a preferred method for identifying peripheral pixels of at least one object in the final result image. FIG. 6 is a flow chart of a preferred embodiment of identifying peripheral pixels of at least one object in the image processing method according to the present disclosure. As shown in FIG. 6, steps S610-S640 are included.

Firstly, the final result image is binarized to generate a binary image (step S610). For example, a specified threshold is set, and pixels having a gray value greater than the threshold are set to a maximum gray value (e.g., 255), and pixels having a gray value less than the threshold are set to a minimum gray value (e.g., 0). The specified threshold may be determined according to the gray values of the moving objects (such as stars) and the surrounding environment, so that the specified threshold may distinguish the moving objects from the surrounding environment.

Then, a first intermediate image having a resolution less than that of the final result image is obtained by performing a multi-point average down-sampling to the binary image (step S620). The down-sampling is a process of reducing a resolution. FIG. 7 is a schematic diagram for illustrating principles of a down-sampling and an up-sampling to an image. As shown in FIG. 7, four pixels may be synthesized to one pixel. At this time, a gray value of the one pixel may be set to an average value of the four pixels. In FIG. 7, the gray values of the four pixels are 255, 0, 0 and 0, respectively, and thus a pixel having a gray value of 64 is obtained after the down-sampling is performed. Of course, the present disclosure is not limited thereto, and the other numbers of pixels may be synthesized to one pixel.

Next, a second intermediate image having a resolution equal to that of the final result image is obtained by performing an up-sampling to the first intermediate image (step S630). The up-sampling is a process of increasing a resolution; if four pixels are synthesized to one pixel in the down-sampling, the one pixel may be re-divided into four pixels, and the four pixels have a same gray value. Specifically, one pixel having a gray value of 64 may be decomposed into four pixels having a gray value of 64.

Finally, pixels of the final result image corresponding to pixels of the second intermediate image with non-zero gray values are identified as peripheral pixels of the at least one object (step S640). Specifically, a template may be established to carry out the above processes for the final result image. Because a second resolution after the up-sampling is performed is same as the resolution of the final result image, a one-to-one correspondence between the pixels in the template and the pixels in the final result image may be established, thus identifying pixels of the final result image corresponding to the pixels with non-zero gray values as peripheral pixels of the at least one object.

Through the above method, a motion track of an object in an environment full of light can be obtained without reducing an aperture value or adjusting a photosensitivity, so as to realize an effect of slow shutter speed while avoiding overexposure.

The foregoing illustrates a plurality of embodiments of the image processing method of the present disclosure. Obviously, those skilled in the art can make various combinations, modifications or transformations to the above embodiments without departing from the spirit and scope of the present disclosure. Those skilled in the art can obtain all other embodiment(s), without any inventive work, which should be within the scope of the present disclosure.

Electronic Apparatus

Hereinafter, the electronic apparatus of the present disclosure will be described in detail in conjunction with the drawings. The electronic apparatus of the present disclosure, for example, may be a device which focuses on shooting such as a digital camera, or may be a device which focuses on a calculating function such as a tablet computer, a laptop computer, a desktop computer, a PDA and so on, or may further be a device which focuses on a calling function such as a smart phone, a portable phone and so on, as long as it can shoot images.

Figure 8:
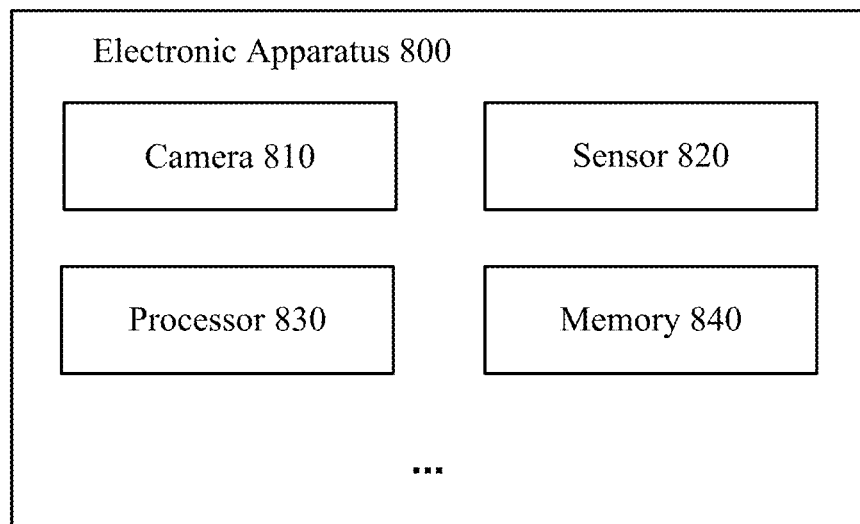
FIG. 8 is a functional block diagram of an electronic apparatus according to the present disclosure.

FIG. 8 is a functional block diagram of an electronic apparatus according to an embodiment of the present disclosure. As shown in FIG. 8, an electronic apparatus 800 comprises: a camera 810, a sensor 820, a processor 830 and a memory 840.

The camera 810 is configured to capture an image, and it may be a camera of which an aperture value is adjustable, or a camera of which an aperture value is not adjustable. The sensor 820 is configured to perform a photometry to current environment. The processor 830, for example, may be a special processor or a general processor, for performing a series of image processing described as follow. The memory 840 is configured to store data. It should be noted that the electronic apparatus 800 may further include other components.

Hereinafter, operations executed by the processer 830 will be described in detail.

Firstly, a photometry is performed by using an existing photometric method, which will be not described in detail here. For an intelligent electronic apparatus, by enabling a camera application, the photometry may be performed to current environment and a preview image may be obtained. Preferably, the electronic apparatus may calculate which exposure parameters may be used to obtain an image having suitable exposure according to a result of the photometry. Generally speaking, an image of 18% Gray is considered to be suitable exposure for human eyes. However, in the present disclosure, the "suitable exposure" should be understood in a broad sense, that is, it represents an exposure effect expected by the users. For example, the users may perform exposure compensation according to their own needs, to make exposure higher or lower. The exposure parameters usually include a photosensitivity, an aperture value and a shutter speed.

Next, a unit shutter speed is determined according to a result of the photometry, a specified photosensitivity and a specified aperture value. The specified photosensitivity and the specified aperture value may be set automatically by the electronic apparatus according to scenarios or set manually by a user. It should be noted that, here the specified photosensitivity and/or the specified aperture value may be different from a photosensitivity and/or an aperture value in a preview image displayed by the electronic apparatus. In addition, in some electronic apparatuses which are not dedicated to shooting such as a smart phone, the aperture value may be fixed, and at this time, the aperture value is the specified aperture value. After the photometry is completed, it may be determined which shutter speed may be used to obtain an image having an exposure amount desired by the users under the specified photosensitivity and the specified aperture value according to a reciprocity law in photography. At this moment, the determined shutter speed is just the unit shutter speed.

Next, it is detected whether there is a first operation. The first operation may be an operation by which the users send an instruction to start shooting. As an unlimited example, the first operation may be to press a specified button (for example, a shutter key, a volume key or virtual buttons on a touch screen of the electronic apparatus) or carry out a certain action (shaking, tilting) and so on. In addition, it may also be to recognize a specified facial expression (blinking, etc.) through a camera of the electronic apparatus.

When the first operation is not detected, the photometry may be re-performed to the current environment, and a unit shutter speed may be re-determined according to a result of the photometry, and the first operation will be further detected. Because the users may change a target object at any time, and ambient light environment around may change at any time, a new shutter speed should be determined according to continuous photometry, to adapt to changes in environment in real time. Of course, the present disclosure is not limited thereto, and the photometry may not be repeated, but the first operation is to be detected repeatedly.

When the first operation is detected, a plurality of images is captured sequentially by using the specified photosensitivity, the specified aperture value and the unit shutter speed and the plurality of images are synthesized. At this time, it is preferred to continuously capture the images at shorter time intervals in a burst shoot mode. Since exposure parameters are determined according to the result of the photometry, a plurality of images captured at this time are images with suitable exposure. And then, the plurality of images are synthesized. Views of the plurality of images captured in this way are approximately the same, and only relative positions of moving objects change, so that tracks of the moving objects may be obtained by synthesizing these images. Preferably, pixels without shifting are synthesized by means of an average gray value, and pixels with shifting are synthesized in a manner of covering. Specific details of synthesizing the plurality of images will be described in detail hereinafter.

A second operation is to be detected after the first operation is detected. The detection of second operation may be performed with the above steps of capturing images and synthesizing images in parallel or alternately. The second operation may be an operation by which the users send an instruction to end shooting. As an unlimited example, the second operation may be to release, or to re-press a specified button (for example, a shutter key, a volume key or virtual buttons on a touch screen of the electronic apparatus) after the first operation, or to carry out a certain action (shaking, tilting) and so on. In addition, it may also be to recognize a specified facial expression (blinking, etc.) through a camera of the electronic apparatus.

When the second operation is not detected, images are further captured sequentially by using the specified photosensitivity, the specified aperture value and the unit shutter speed and the images are synthesized. When the second operation is detected, processing comes to an end.

Through the above processing, a motion track of an object in an environment full of light can be obtained without reducing an aperture value or adjusting a photosensitivity, so as to realize an effect of slow shutter speed while avoiding overexposure.

Hereinafter, a preferred embodiment of capturing a plurality of images and synthesizing the plurality of images will be described in conjunction with the drawings in detail. As described above, when a first operation is detected, a plurality of images are captured sequentially by using the specified photosensitivity, the specified aperture value and the unit shutter speed and the plurality of images are synthesized. For convenience, an example of capturing three images of a, b and c is taken for description hereinafter, but those skilled in the art should understand that the present disclosure is not limited thereto, and there may be a much larger number of images in practice.

FIG. 2 is a schematic diagram for illustrating a preferred embodiment of a synthesizing process of an image processing method or an electronic apparatus according to the present disclosure. As shown in FIG. 2, a first image a is stored as it is obtained; next, when a second image b is obtained, a and b are synthesized to obtain an image a+b, and finally, when a third image c is obtained, the image a+b and the image c are synthesized, to obtain a final image a+b+c. Thus, it is possible to synthesize images while capturing, which may not only save running time, but also spare overhead of the memory. Of course, the present disclosure is not limited thereto, the plurality of images a, b and c may be obtained at first, and then they are synthesized together, so as to directly obtain the image a+b+c.

Hereinafter, operations executed by the processer 830 of the electronic apparatus 800 will be further described in conjunction with FIG. 3. FIG. 3 is a schematic diagram for illustrating an operation of a memory in the preferred embodiment of the synthesizing process of the electronic apparatus according to the present disclosure. As shown in FIG. 3, the electronic apparatus captures a first image by using the specified photosensitivity, the specified aperture value and the unit shutter speed when a first operation is detected, and stores the first image as a result image of a first round in a memory. Next, it comes to a second round of processing. In the second round of processing, the electronic apparatus further captures a second image by using the specified photosensitivity, the specified aperture value and the unit shutter speed, and reads the result image of a previous round (i.e., the first round) from the memory, and then synthesizes the second image and the result image of the first round, so as to generate a result image of the second round. When a second operation is not detected, the result image of the second round is stored in the memory and a third round of processing is performed. The result image of the second round is output when the second operation is detected. In the second round of processing, the electronic apparatus further captures a third image by using the specified photosensitivity, the specified aperture value and the unit shutter speed, and reads the result image of a previous round (i.e., the second round) from the memory, and then synthesizes the third image and the result image of the second round, so as to generate a result image of the third round. When the second operation is not detected, the result image of the third round is stored in the memory and a fourth round of processing is performed. When the second operation is detected, the result image of the third round is output. In a similar way, a final result image is output until the second operation is detected. Through this preferred embodiment, it is possible to use only one memory to perform the above-described operations repeatedly, which may not only save running time, but also spare overhead of the memory.

After the second operation is detected, even though the obtained image may reflect a track of a moving object, due to limitations such as a continuous shooting speed, running time of storing and synthesizing and so on, the track of the moving object is easy to have discontinuous states such as disconnecting and fracturing in a+b+c shown in FIG. 2. In order to better simulate a slow shutter speed, after the second operation is detected, a further processing may be performed to eliminate the discontinuous states. Here, the discontinuous states of moving objects in a finally synthesized image may be eliminated by using an image expansion technology; due to heavy overhead of running the image expansion technology, the present disclosure further provides a preferred embodiment to process the discontinuous states in the image.

Firstly, peripheral pixels of at least one object in a final result image are identified. Taking shooting a star track for example, because moving objects are stars in the sky, which are shown as a plurality of bright points in the synthesized image in FIG. 2, peripheral pixels around the plurality of bright points should be identified. Here, the peripheral pixels may be identified by using an existing method, for example, an edge detection is performed by using a Canny operator or a Sobel operator; after a contour pixel is obtained, eight pixels around the contour pixel are identified as the peripheral pixels, and so on. In addition, the present disclosure further provides a preferred method for identifying peripheral pixels, which will be described in detail later.

Then, the peripheral pixels are blurred to generate a target image. The peripheral pixels are blurred after the peripheral pixels around the moving object are identified, and thus the discontinuous pixels may be modified as continuous pixels, as shown in FIG. 5. The blurring process may be implemented by setting gray values of the peripheral pixels to average gray value of the pixels in a specified region of the peripheral pixels.

Finally, the target image is output.

In this way, the final target image can simulate a shooting with a slow shutter speed, that is, a motion track of an object in an environment full of light can be obtained without reducing an aperture value or adjusting a photosensitivity, so as to realize an effect of slow shutter speed while avoiding overexposure.

The present disclosure further provides a preferred embodiment for identifying peripheral pixels of at least one object in the final result image.

Firstly, the final result image is binarized to generate a binary image. For example, a specified threshold is set, and pixels having a gray value greater than the threshold are set to a maximum gray value (e.g., 255), and pixels having a gray value less than the threshold are set to a minimum gray value (e.g., 0). The specified threshold may be determined according to the gray values of the moving objects (such as stars) and the surrounding environment, so that the specified threshold may distinguish the moving objects from the surrounding environment.

Then, a first intermediate image having a resolution less than that of the final result image is obtained by performing a multi-point average down-sampling to the binary image. The down-sampling is a process of reducing a resolution. FIG. 7 is a schematic diagram for illustrating principles of a down-sampling and an up-sampling to an image. As shown in FIG. 7, four pixels may be synthesized to one pixel. At this time, a gray value of the one pixel may be set to an average value of the four pixels. In FIG. 7, the gray values of the four pixels are 255, 0, 0 and 0, respectively, and thus a pixel having a gray value of 64 is obtained after the down-sampling is performed. Of course, the present disclosure is not limited thereto, and the other numbers of pixels may be synthesized to one pixel.

Next, a second intermediate image having a resolution equal to that of the final result image is obtained by performing an up-sampling to the first intermediate image. The up-sampling is a process of increasing a resolution; if four pixels are synthesized to one pixel in the down-sampling, the one pixel may be re-divided into four pixels, and the four pixels have a same gray value. Specifically, one pixel having a gray value of 64 may be decomposed into four pixels having a gray value of 64.

Finally, pixels of the final result image corresponding to pixels of the second intermediate image with non-zero gray values are identified as peripheral pixels of the at least one object. Specifically, a template may be established to carry out the above processes for the final result image. Because a second resolution after the up-sampling is performed is same as the resolution of the final result image, a one-to-one correspondence between the pixels in the template and the pixels in the final result image may be established, thus pixels of the final result image corresponding to the pixels with non-zero gray values are identified as peripheral pixels of the at least one object.

Through the above processing, a motion track of an object in an environment full of light can be obtained without reducing an aperture value or adjusting a photosensitivity, so as to realize an effect of slow shutter speed while avoiding overexposure.

Through the above description of the implementation modes, a person of skill in the art can clearly know that the present disclosure can be implemented by a software plus necessary hardware platform; of course, it can also be wholly executed by the hardware. Based on such understanding, all or part of contribution made by the technical solution of the present disclosure to the background art can be embodied in a form of software product, and the computer software product can be stored in storage mediums such as an ROM/RAM, a disk, and a CD, and include a plurality of instructions to enable a computer apparatus (which may be a personal computer, a server, a network apparatus or the like) to execute the methods described in respective embodiments or certain parts of the embodiments of the present disclosure.

The foregoing illustrates a plurality of embodiments of the electronic apparatus of the present disclosure. Obviously, those skilled in the art can make various combinations, modifications or transformations to the above embodiments without departing from the spirit and scope of the present disclosure. Those skilled in the art can obtain all other embodiment(s), which should be within the scope of the present disclosure.

The invention claimed is:

1. An image processing method, applied to an electronic apparatus, wherein the image processing method comprises:
    performing a photometry to current environment;
    determining a unit shutter speed according to a result of the photometry, a specified photosensitivity, and a specified aperture value; and
    capturing, when a first operation is detected, a plurality of images sequentially by using the specified photosensitivity, the specified aperture value and the unit shutter speed and synthesizing the plurality of images until a second operation is detected.

2. The image processing method according to claim 1, wherein, the capturing further includes:
    capturing a first image as a result image of a first round by using the specified photosensitivity, the specified aperture value, and the unit shutter speed when the first operation is detected;
    storing the result image of the first round in a memory of the electronic apparatus;
    performing an i-th round of processing, where i is a natural number increasing from 2 and greater than or equal to 2,
    the i-th round of processing including:
    capturing an i-th image by using the specified photosensitivity, the specified aperture value and the unit shutter speed;
    reading a result image of an (i−1)-th round from the memory;
    synthesizing the i-th image and the result image of the (i−1)-th round to generate a result image of the i-th round; and
    storing the result image of the i-th round in the memory and performing an (i+1)-th round of processing, when the second operation is not detected,
    outputting the result image of the i-th round when the second operation is detected.

3. The image processing method according to claim 2, wherein, the outputting the result image of the i-th round includes:
    identifying peripheral pixels of at least one object in the result image of the i-th round;
    blurring the peripheral pixels to generate a target image;
    outputting the target image.

4. The image processing method according to claim 3, wherein, the identifying peripheral pixels of at least one object in the result image of the i-th round includes:
    binarizing the result image of the i-th round to generate a binary image;
    performing a multi-point average down-sampling to the binary image to obtain a first intermediate image having a resolution less than that of the result image of the i-th round;
    performing an up-sampling to the first intermediate image to obtain a second intermediate image having a resolution equal to that of the result image of the i-th round;
    identifying pixels of the result image of the i-th round corresponding to pixels with non-zero gray values in the second intermediate image as peripheral pixels of the at least one object.

5. The image processing method according to claim 4, wherein, the blurring the peripheral pixels includes setting gray values of the peripheral pixels to an average gray value of the pixels in a specified region of the peripheral pixels.

6. An electronic apparatus comprising:
a camera configured to capture an image;
a sensor configured to perform a photometry to current environment;
a processor configured to determine a unit shutter speed according to a result of the photometry, a specified photosensitivity, and a specified aperture value, and when a first operation is detected, capture a plurality of images sequentially by using the specified photosensitivity, the specified aperture value and the unit shutter speed and synthesize the plurality of images until a second operation is detected.

7. The electronic apparatus according to claim 6, wherein,
the processor captures a first image as a result image of a first round by using the specified photosensitivity, the specified aperture value and the unit shutter speed when the first operation is detected, stores the result image of the first round in a memory of the electronic apparatus, and performs an i-th round of processing, where i is a natural number increasing from 2 and greater than or equal to 2,
the i-th round of processing including:
capturing an i-th image by using the specified photosensitivity, the specified aperture value and the unit shutter speed;
reading a result image of an (i−1)-th round from the memory;
synthesizing the i-th image and the result image of the (i−1)-th round to generate a result image of the i-th round;
storing the result image of the i-th round in the memory and performing an (i+1)-th round of processing, when the second operation is not detected, outputting the result image of the i-th round when the second operation is detected.

8. The electronic apparatus according to claim 7, wherein, the processor identifies peripheral pixels of at least one object in the result image of the i-th round when the second operation is detected, blurs the peripheral pixels to generate a target image, and outputs the target image.

9. The electronic apparatus according to claim 8, wherein, the processor binarizes the result image of the i-th round to generate a binary image, performs a multi-point average down-sampling to the binary image to obtain a first intermediate image having a resolution less than that of the result image of the i-th round, performs an up-sampling to the first intermediate image to obtain a second intermediate image having a resolution equal to that of the result image of the i-th round, identifies pixels of the result image of the i-th round corresponding to pixels with non-zero gray values in the second intermediate image as peripheral pixels of the at least one object, and thus identifies peripheral pixels of at least one object in the result image of the i-th round.

10. The electronic apparatus according to claim 8, wherein, the processor blurs the peripheral pixels by setting gray values of the peripheral pixels to average gray value of the pixels in a specified region of the peripheral pixels.

* * * * *